(12) United States Patent
Williams

(10) Patent No.: US 10,375,986 B1
(45) Date of Patent: Aug. 13, 2019

(54) SPACING DRUM AND METHOD

(71) Applicant: ALTRIA CLIENT SERVICES LLC, Richmond, VA (US)

(72) Inventor: Dwight David Williams, Powhatan, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 15/908,640

(22) Filed: Feb. 28, 2018

(51) Int. Cl.
*B65G 33/02* (2006.01)
*B65G 33/04* (2006.01)
*A24C 5/18* (2006.01)
*A24D 3/02* (2006.01)

(52) U.S. Cl.
CPC .......... *A24C 5/1871* (2013.01); *A24C 5/1821* (2013.01); *A24D 3/0229* (2013.01); *A24D 3/0287* (2013.01); *B65G 33/02* (2013.01); *B65G 33/04* (2013.01)

(58) Field of Classification Search
CPC ................................. B65G 33/02; B65G 33/04
USPC ................................. 198/459.3, 459.1, 459.8
See application file for complete search history.

(56) References Cited

U.S. PATENT DOCUMENTS

| | | | |
|---|---|---|---|
| 3,026,991 A * | 3/1962 | Kinsley | B65G 33/04 198/459.4 |
| 3,143,202 A * | 8/1964 | Rowlands | A24D 3/0287 198/459.2 |
| 3,164,242 A | 1/1965 | Schubert et al. | |
| 3,228,512 A | 1/1966 | Rudszinat et al. | |
| 3,332,529 A * | 7/1967 | Penzias | A24O 5/478 198/459.3 |
| 3,368,460 A | 2/1968 | Schubert | |
| 3,854,384 A | 12/1974 | Naylor | |
| 4,003,277 A | 1/1977 | Oesterling | |
| 4,411,640 A * | 10/1983 | Hall | A24D 3/0225 222/221 |
| 5,012,823 A | 5/1991 | Keritsis et al. | |
| 5,810,016 A | 9/1998 | Okumoto | |
| 8,118,721 B2 | 2/2012 | Cieslikowski et al. | |
| 8,307,973 B2 * | 11/2012 | Pelagatti | B65G 33/06 198/459.3 |
| 9,221,614 B2 | 12/2015 | Figarski et al. | |

(Continued)

FOREIGN PATENT DOCUMENTS

GB 2034577 A 6/1980
WO 2015044848 A1 4/2015

*Primary Examiner* — James R Bidwell
(74) *Attorney, Agent, or Firm* — Harness, Dickey & Pierce, P.L.C.

(57) ABSTRACT

A spacing drum comprising: a segment receiving drum section capable of receiving a predetermined number of segments per revolution of the drum from a procession of segments approaching the segment receiving drum section at a segment-feed spacing and a segment-feed speed; a segment releasing drum section capable of releasing the predetermined number of segments at a segment-release spacing and a segment-release speed; and a radial profile flight comprising a continuous arc segment extending across at least portions of the segment receiving drum section and the segment releasing drum section. Associated methods are also provided, including method of changing pitch along a spacing drum progressively with a radial profile flight.

24 Claims, 8 Drawing Sheets

(56) References Cited

U.S. PATENT DOCUMENTS

2013/0029821 A1\* 1/2013 Hoffmann ............ A24D 3/0287
                                                                               493/4
2014/0048083 A1   2/2014 Williams et al.
2014/0251759 A1\* 9/2014 Yin ...................... B65G 47/907
                                                                            198/459.3

\* cited by examiner

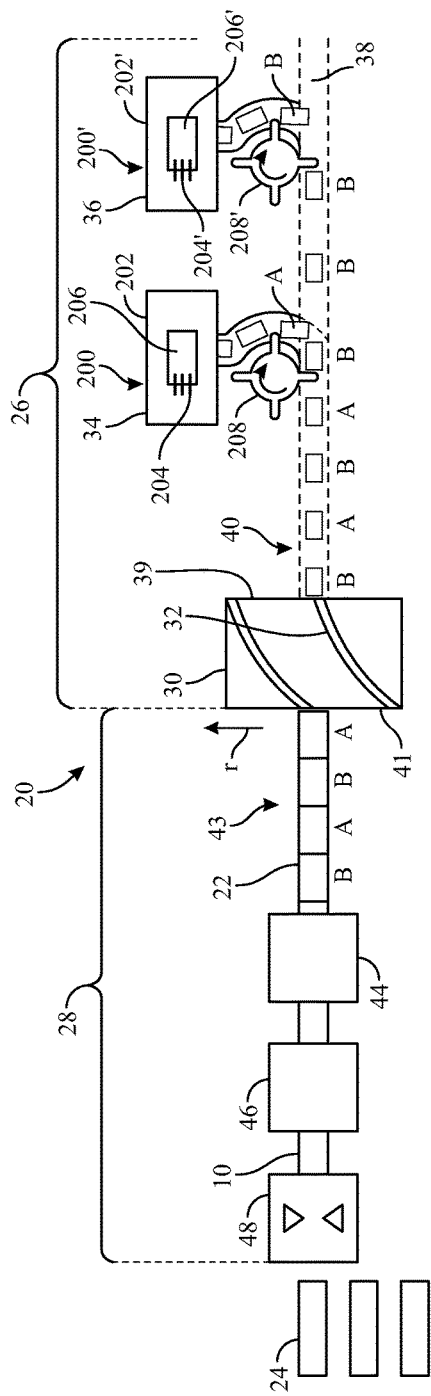
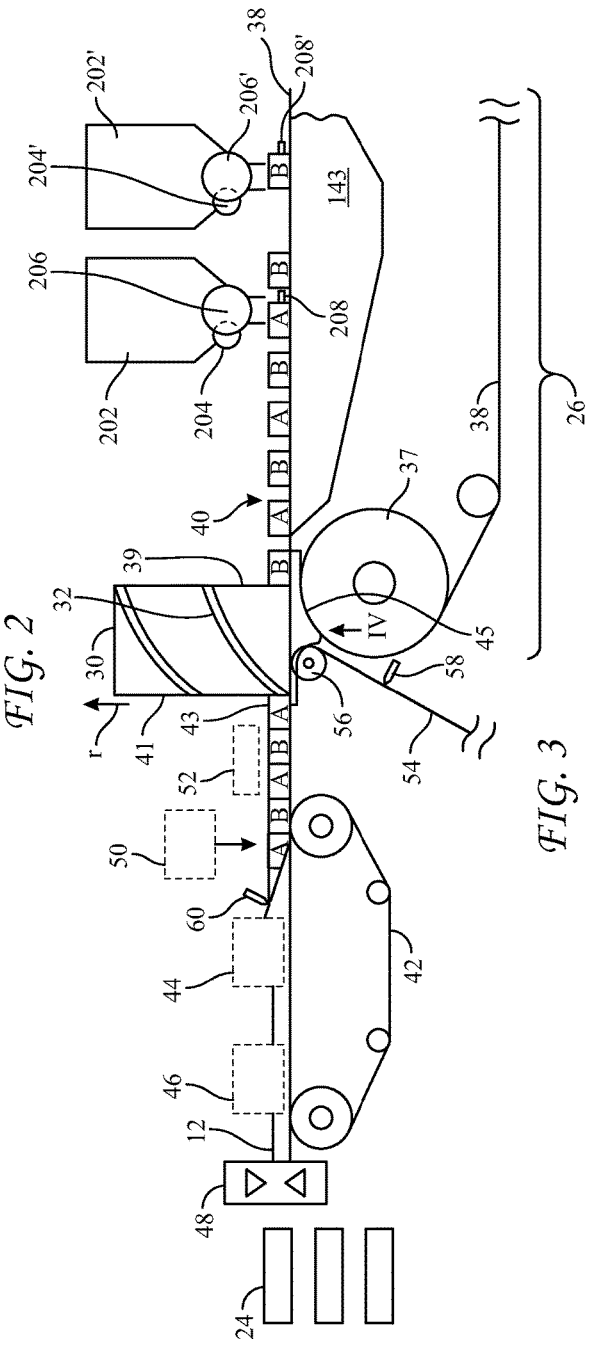
FIG. 2
FIG. 3

SPACING DRUM AND METHOD

FIELD

This invention relates to generally to rod making in the manufacture of tobacco or filter rods and/or tobacco products.

ENVIRONMENT

In certain spacing drums, the pitch the drum where product components enter the drum is different than the pitch of the drum where components exit the drum, whereby the pitch changes at a discrete transition point. At the discrete transition point (for example, from a higher pitch to a slower pitch), registration issues may occur as a component traveling through the drum may lose contact with the drum. For example, in U.S. Pat. No. 3,854,384 to Naylor reference is made to bring a repeating series of components "into closely abutting relationship by a helical closing-up drum 20 of known type." Although the patent is without further written description of the type of drum, in FIG. 4, the patent shows a representation of a drum 20, wherein the flights (or lands) of the drum have an abrupt transition in pitch. It has been found that such abrupt transitions may cause registration issues, because a component travelling through the drum guided by a flight of the drum may lose contact with the flight at or about the abrupt transition.

SUMMARY

An aspect of certain embodiments of the present disclosure provides a spacing drum comprising a segment receiving drum section capable of receiving a predetermined number of segments per revolution of the drum from a procession of segments approaching the segment receiving drum section at a segment-feed spacing and a segment-feed speed, a segment releasing drum section capable of releasing the predetermined number of segments at a segment-release spacing and a segment-release speed, wherein the segment-release spacing is different from the segment-feed spacing, the segment-release speed is different from the segment-feed speed, or both the segment-release spacing is different from the segment-feed spacing and the segment-release speed is different from the segment-feed speed and a radial profile flight comprising a continuous arc segment extending across at least portions of the segment receiving drum section and the segment releasing drum section, the continuous arc segment arranged to transition a segment of the predetermined number of segments from the segment-feed spacing and the segment-feed speed to the segment-release spacing and the segment-release speed, by pushing the segment as the segment travels from the segment receiving drum section to the segment releasing drum section.

Another aspect of certain embodiments of the present disclosure provides a method of changing pitch along a spacing drum progressively, the method comprising representing a peripheral surface of a spacing drum with a planar drum view, the spacing drum and the planar drum view having an entrance edge at which a procession of segments enter the spacing drum at a segment-feed rate and a segment-feed spacing and an exit edge at which the procession of segments leave the spacing drum at a segment-release speed and with a segment-release spacing, defining adjacent the entrance edge a first straight line corresponding to a first hypothetical flight, the first hypothetical flight defining a first pitch, defining adjacent the exit edge a second straight line corresponding to a second hypothetical flight, the second hypothetical flight defining a second pitch, resolving an arc-center by resolving an angle of intersection between the first straight line and the second straight line, bisecting the resolved angle of intersection to project a first centering line, projecting a second centering line perpendicular to the second straight line from where the second straight line intersects the exit edge of the drum, whereby the arc center is resolved by an intersection of the first and second centering lines, projecting an arc across the planar drum view from the resolved arc center while using as a radius a distance between the resolved arc center and the location where the second straight line intersects the exit edge of the drum, forming a radial profile flight upon the drum peripheral surface corresponding to the arc projected across the planar drum view.

Another aspect of certain embodiments of the present disclosure provides a spacing drum comprising a radial profile flight which changes pitch progressively and may be constructed in accordance with the aforementioned method.

Still another aspect of certain embodiments of the present disclosure provides a spacing drum comprising a drum body having a segment-receiving end and a segment-releasing end, a radial profile flight disposed along the drum body, with the radial profile flight being defined by a radius and a first offset arc center such that adjacent the segment-releasing end of the drum, a releasing arcuate portion of the radial profile flight is configured to push a segment along a segment path at a desired segment-exit velocity, and wherein the radial profile flight includes a second arcuate portion adjacent the segment-receiving end of the drum body, the second arcuate portion being configured to push the segment at a segment-receiving velocity different from the segment-exit velocity, with the radial profile flight including an arcuate intermediate portion extending continuously between first and second arcuate portions.

Yet another aspect of certain embodiments of the present disclosure provides a method of establishing an exit speed and an exit spacing between members of a procession of units, comprising establishing a procession of units moving at an entrance speed and having an entrance spacing between the units, converting the entrance spacing to the exit spacing and/or the entrance speed to the exit speed by passing the procession of units through a spacing drum while contacting units of the procession with radial profile flights of the spacing drum, the radial profile flights being arcuately configured such that continuous contact between a radial profile flight of the radial profile flights and a respective unit is generally maintained during the conversion, whereby the radial profile flights change pitch continuously from an entrance edge of the drum to an exit edge of the drum, and whereby the spacing is changed from the entrance spacing to the exit spacing and/or the speed is changed from the entrance speed to the exit speed.

Still another aspect of certain embodiments of the present disclosure provides a spacing drum comprising: a drum body having a segment-receiving end and a segment-releasing end, and a radial profile flight disposed along the drum body, the radial profile flight defined by a radius and a first offset arc center such that adjacent the segment-releasing end of the drum, a releasing arcuate portion of the radial profile flight is configured to push a segment along a segment path at a desired segment-exit speed, the radial profile flight including a second arcuate portion adjacent the segment-receiving end of the drum body, the second arcuate portion being configured to push the segment at a segment-receiving speed different from the segment-exit speed, the radial profile flight including an arcuate intermediate portion extending continuously between first and second arcuate portions.

BRIEF DESCRIPTION OF THE DRAWINGS

The forms disclosed herein are illustrated by way of example, and not by way of limitation, in the figures of the accompanying drawings and in which like reference numerals refer to similar elements and in which:

FIG. 2 is a top view representation of a machine layout comprising a spacing drum in accordance with an example embodiment of the disclosure;

FIG. 3 is a side view representation of the machine layout and spacing drum of FIG. 2, according to an example embodiment;

DETAILED DESCRIPTION

Figure 1A:
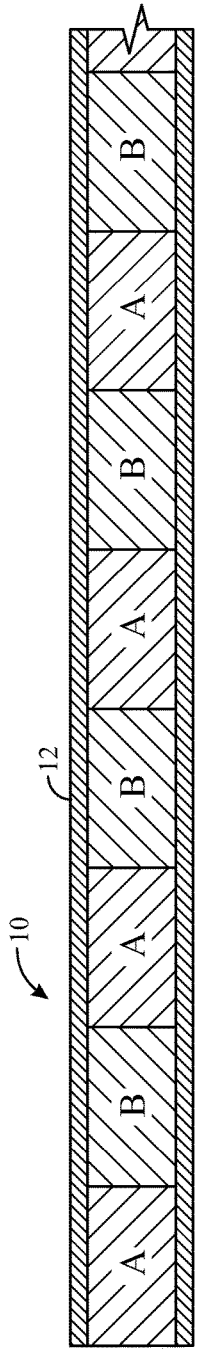
FIG. 1A is cross-section of an example of a rod section that may be produced using example embodiments of the disclosure.

Each of the following terms: "includes," "including," "has," "having," "comprises," and "comprising," and, their linguistic or grammatical variants, derivatives, and/or conjugates, as used herein, means "including, but not limited to."

Throughout the illustrative description, the examples, and the appended claims, a numerical value of a parameter, feature, object, or dimension, may be stated or described in terms of a numerical range format. It is to be fully understood that the stated numerical range format is provided for illustrating implementation of the forms disclosed herein, and is not to be understood or construed as inflexibly limiting the scope of the forms disclosed herein.

Moreover, for stating or describing a numerical range, the phrase "in a range of between about a first numerical value and about a second numerical value," is considered equivalent to, and means the same as, the phrase "in a range of from about a first numerical value to about a second numerical value," and, thus, the two equivalently meaning phrases may be used interchangeably.

It is to be understood that the various forms disclosed herein are not limited in their application to the details of the order or sequence, and number, of steps or procedures, and sub-steps or sub-procedures, of operation or implementation of forms of the method or to the details of type, composition, construction, arrangement, order and number of the system, system sub-units, devices, assemblies, sub-assemblies, mechanisms, structures, components, elements, and configurations, and, peripheral equipment, utilities, accessories, and materials of forms of the system, set forth in the following illustrative description, accompanying drawings, and examples, unless otherwise specifically stated herein. The apparatus, systems and methods disclosed herein can be practiced or implemented according to various other alternative forms and in various other alternative ways.

It is also to be understood that all technical and scientific words, terms, and/or phrases, used herein throughout the present disclosure have either the identical or similar meaning as commonly understood by one of ordinary skill in the art, unless otherwise specifically defined or stated herein. Phraseology, terminology, and, notation, employed herein throughout the present disclosure are for the purpose of description and should not be regarded as limiting.

The present disclosure may be used for the manufacture of any type of rod, such as filter or tobacco rods, and/or any other tobacco products, such as smoking, heat not burn and other articles that generate, heat, smoke, etc.

In the past, spacing drums have been constructed to have compound flights, which were in effect a set of flights having a first pitch at the entrance of the spacing drum and a second pitch at the exit of the spacing drum with an abrupt transition therebetween. The abrupt transition may create registration issues, as a segment traveling through the drum guided by a flight may lose contact with the flight at or about the abrupt transition, and/or may move on its own inertia. Such uncontrolled motion may frustrate consistent positioning of the segment as it exits the drum.

Example embodiments disclosed herein provide, amongst various aspects, a spacing drum comprising radial profile flights in accordance with the teachings which follow.

Figure 1B:
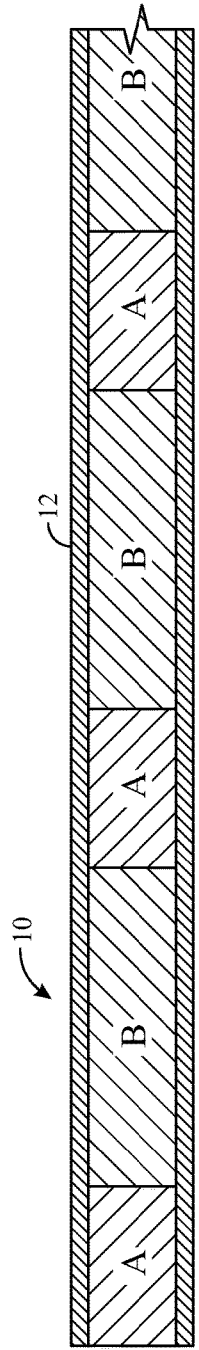
FIG. 1B is cross-section of another example of a rod section that may be produced using example embodiments of the disclosure.

Referring now to FIGS. 1A and 1B, certain embodiments of the present disclosure provide systems and apparatus for producing rods 10 comprising one, two or more components. In one example, such as a rod including segments A and B, the segments A and B may be of a common length (FIG. 1A) or differ in length (FIG. 1B). The segments may be constructed from a common material or differ in composition.

Figure 1C:
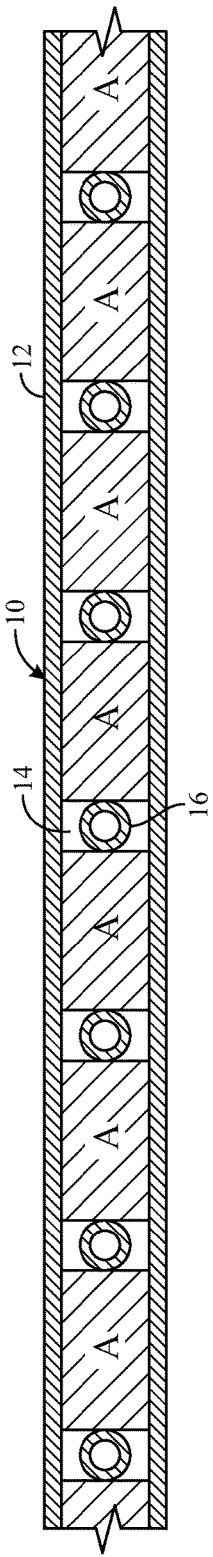
FIG. 1C is cross-section of still another example of a rod section that may be produced using example embodiments of the disclosure.

Referring to FIG. 1C, the continuous rod 10 may comprise a repeated pattern of segments (such as A, B, C, D or more) or a repeated pattern of a single segment A (such as shown in FIG. 1C) and may further comprise spacings 14 provided between one more of the segments as part of the repeated pattern. The rod 10 may further include an element inserted into each of the spaces 14 such as, by way of non-limiting examples, tobacco, tobacco derivatives, a crushable flavor bead 16 or a bed of particles such as particles of an activated carbon or other adsorbent or other aerosol treating or flavoring particles.

Spacing drum embodiments disclosed herein are not limited to use for producing multi-component rods, and may be used in any manufacturing operations where a spacing drum may be helpful.

Referring now to FIGS. 2 and 3, an example embodiment of a machine system 20 may be configured to produce a continuous rod 10 which may be severable into individual rods 24. The machine system 20 may comprise a segment feeding section 26 and a rod forming section 28.

The segment feeding section 26 may comprise a radial profile spacing drum 30 according to an example embodiment with one or more radial profile flights 32, a first source 34 of the segments A, a second source 36 of the segments B and an endless feed belt 38. The endless feed belt 38 may be directed about a roller 37 at a location adjacent radial profile spacing drum 30. The endless feed belt 38 may receive the individual segments A and B from the first and second sources 34 and 36, respectively, in an alternating relation so as to establish a first, feed procession 40 of filter segments A, B, which may move at the speed of feed belt 38 ("$v_1$").

In some embodiments, the sources 34 and 36 of individual segments may comprise hopper sections 200, 200'. The hopper sections 200, 200' may include a hopper 202, 202', a plurality of knives 204, 204' which may cooperate with a knife drum 206, 206'. The output of segments A,B from the hoppers 202, 202', respectively, may be directed onto the feed belt 38 by operation of metering wheels 208, 208'. The particulars of the construction and operation of the hopper sections 200, 200' are familiar to those of ordinary skill in the art.

If it were desired to include additional segments (such as a segment C, D or more), then additional hopper sections 200'', 200''' or more could be arranged in like manner to the above description. Likewise, it may be a desired to operate with only a single hopper section 200, in which case, all the segments may be the same (such as an A segment).

Referring back to the example embodiment shown in FIGS. 2 and 3, the phase of the output of segments A,B from the hoppers 202, 202', respectively, may be adjusted to adjust their relative positions along the feed belt 38. For example, the phase relation may be selected to place each component B closer to the leading component A that precedes it or instead place each component B closer to the trailing component A that may be located behind it.

In some example embodiments, a vacuum plenum 143 may be disposed beneath the endless feed belt 38 to help maintain the segments A, B at their spaced locations along the endless feed belt 38. The endless feed belt 38 may move the feed procession 40 toward the entrance end 39 of the radial profile spacing drum 30 at a suitable feed speed $v_1$.

In an example embodiment, as segments A and B pass through the spacing drum 30, segments A, B may be continuously decelerated (or accelerated) to a speed $v_2$ of the rod forming section 28 and transformed into desired sequence and the desired end-to-end relationship of the continuous rod 10 (e.g., abutting or other desired relationship or spacing). In so doing, the radial profile spacing drum 30 may discharge the individual segments A, B at a velocity $v_2$ which may match that of the belt speed of a garniture belt 42 (or any other type of belt) of the rod forming section 28 (and may also match that of plug wrap 54 that may be drawn by the garniture belt 42). Accordingly, the spacing drum 30 may establish a second, output procession of segments 43 with a different spacing between segments, and/or different speed of the segments, compared to the first procession of segments 40 at the entrance end 39.

In certain example embodiments, the speed $v_1$ of the first procession of segments 40 may be greater than the speed $v_2$ of the second procession of segments 43, wherein the spacing drum 30 may be configured to lower the speed of the segments as the segments progress through the drum. It is to be realized that in other embodiments the relative speeds of first and second procession of segments may differ from that of the non-limiting example embodiment presented herein (for example, in certain embodiments the speeds v1 and v2 may be the same, and in certain embodiments v2 may greater than v1); and that the relative speeds, rod construction and other details of the example embodiment are chosen only for purposes of facilitating an understanding of the teachings herein and not as a limitation upon the applicability of those teachings to other embodiments.

In some embodiments, the radial profile spacing drum 30 may cooperate with a bridge 45 that may be configured to provide support and grooved guidance for the segments A, B as they are moved linearly beyond the operative end of the feed belt 38 and into the radial profile spacing drum 30, whereupon a radial profile flight 32 may cut across empty space behind a segment and progress into contact with a trailing end portion of the segment to continuously push the segment toward the exit end 41 of the radial profile spacing drum 30.

Figure 10A:
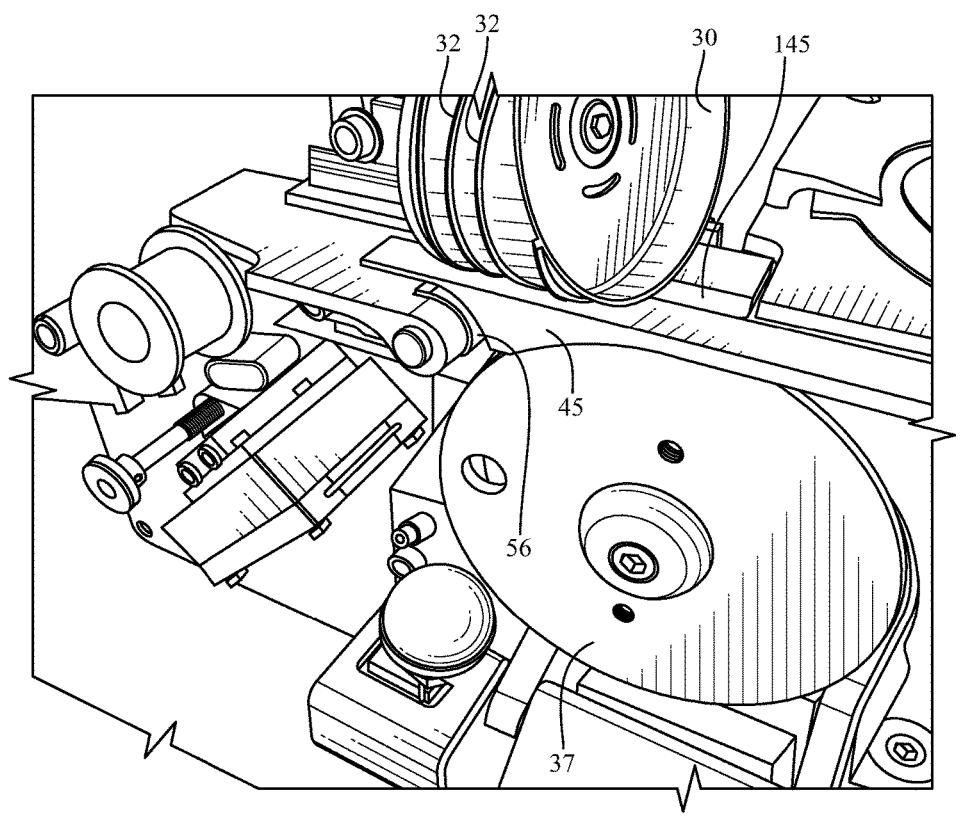
FIG. 10A is a detail perspective view at a location of a spacing drum and bridge section of a machine layout such as shown in FIGS. 2 and 3, in accordance with an example embodiment.
Figure 10B:
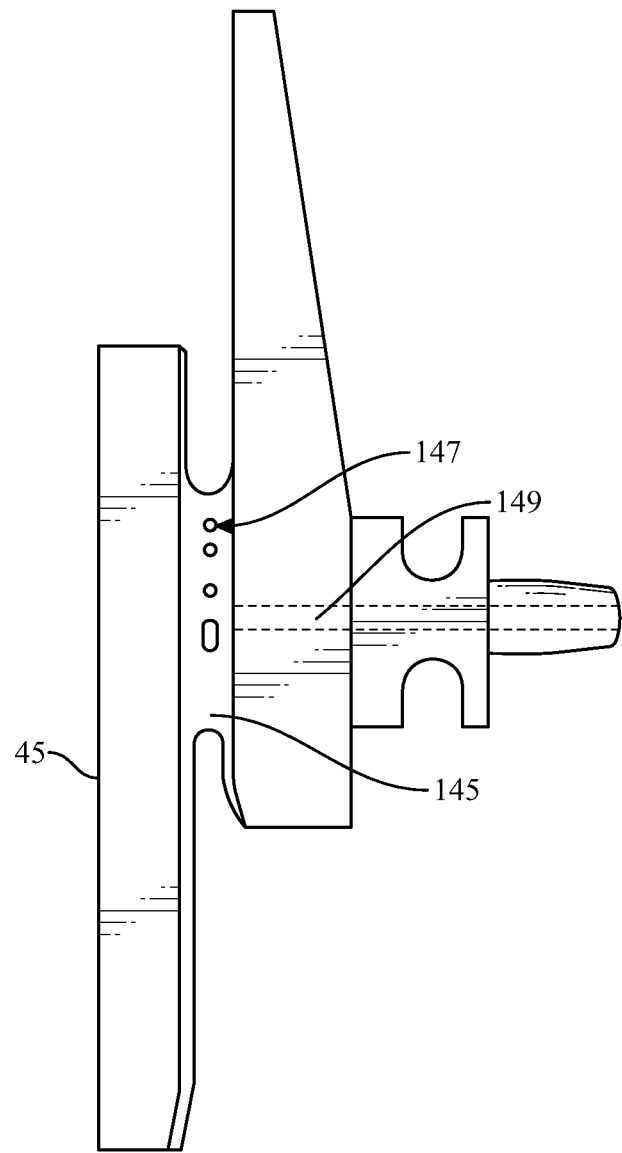
FIG. 10B is a top planar view of an example embodiment of a bridge piece suitable for use in the bridge section shown in FIG. 10A.

Referring now also to FIGS. 10A and 10B, in various embodiments, the bridge 45 may extend beneath radial profile spacing drum 30 and may be provided with a groove 145 of sufficient depth to counteract any tendency a radial profile flight 32 to displace a component A,B laterally of the intended linear path. In some embodiments, the groove 145 may include a plurality of vacuum ports 147 that communicate with a source of vacuum through an internal passage 149 in the bridge 45. The placement of the vacuum ports 147 and the draw of vacuum may be arranged to help maintain a desired, relative positioning (registration) of the components A,B as they cross the bridge 45 or portions thereof.

The rod forming section 28 may comprise an endless tube belt 42 (garniture belt), a garniture 44, a glue setting station 46 and a cutter 48. The endless garniture belt 42 of the rod forming section 28 may be configured to draw a continuous ribbon of web 54 about a roller 56 positioned adjacent the exit end 41 of radial profile spacing drum 30 so that as segments A, B may be pushed out from exit end 41 of the spacing drum 30 to form the second procession of segments 43, the procession 43 may be positioned upon the continuous ribbon of web 54 and may be drawn with it into and though the garniture 44, whereupon the web 54 may be wrapped about and securely glued about the procession 43 of segments A, B. In some embodiments, the rod forming section 28 may further comprise a suitable glue applicator 58 that may be operative at a location upstream of the roller 56 to help maintain the relative placements of the segments A, B and a second, suitable glue applicator 60 which may be operative at or about the garniture 44 to seal the seam of the continuous filter rod 10 produced by garniture 44. The freshly formed, continuous filter rod 10 may be drawn through a suitable glue setting station 46 and then through a suitable cutter 48, where the continuous rod 10 may be repetitively severed into the desired multi or single-component rods 24.

For production of certain filter rods 24, the rod forming section 28 may further comprise an insertion device 50 for inserting activated carbon, adsorbents, flavorants, beads or the like. Examples of such devices may be found in U.S. Pat. No. 4,411,640 to Hall; U.S. Pat. No. 5,875,824 to Atwell et al., and U.S. Pat. No. 5,542,901 to Atwell et al.

Figure 4:
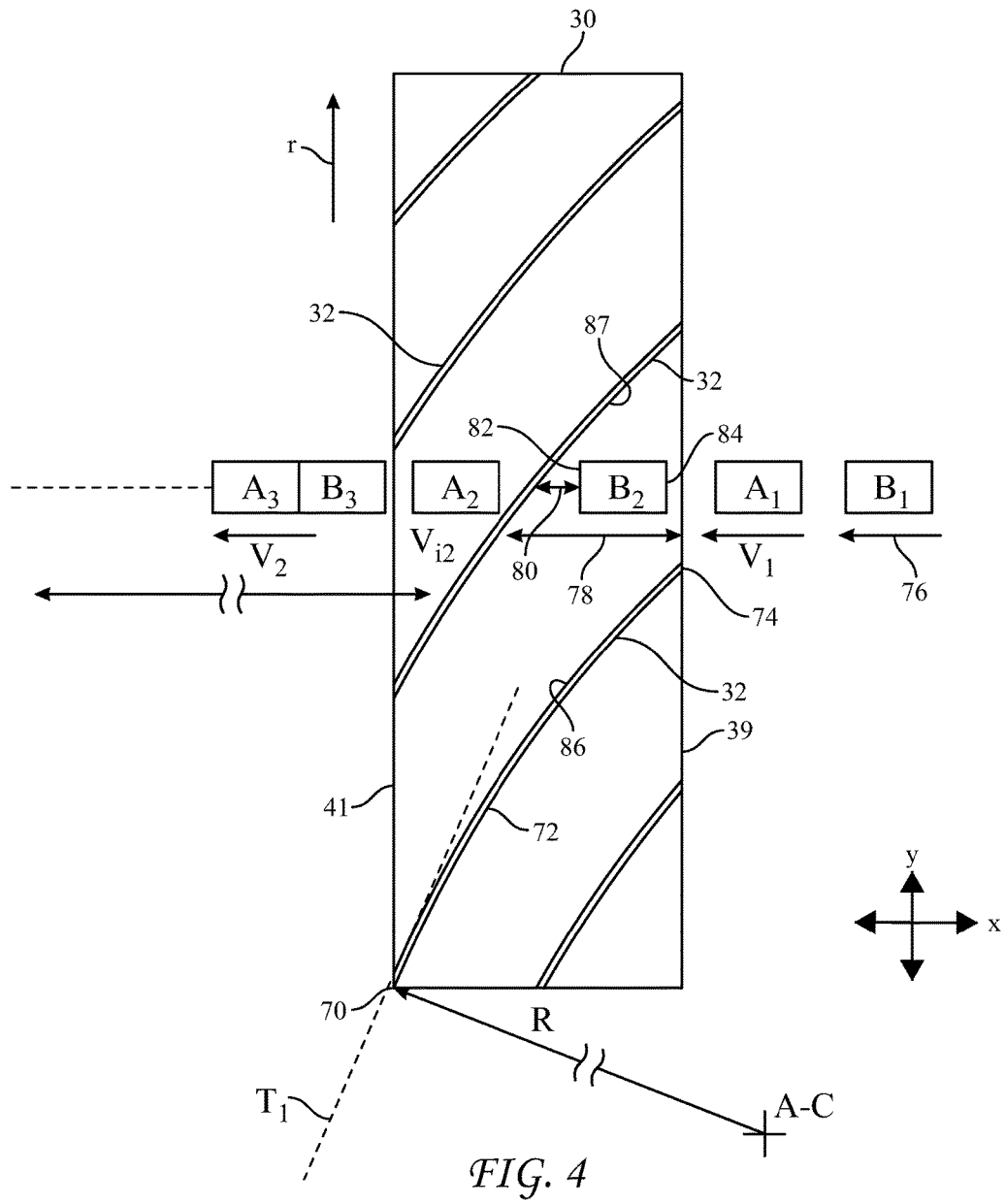
FIG. 4 is a representation of the spacing drum as viewed in the direction of arrow IV in FIG. 3, according to an example embodiment.

Referring now to FIG. 4, in some example embodiments, the radial profile spacing drum 30 may comprise a radial profile flight 32, which at the exit end 41 of the spacing drum 30 may define a tangent $T_1$, by which at the rotational speed of the drum 30, the flight 32 may impart at the drum exit 41, a velocity $v_2$ to a filter segment (A or B). The radial profile flight 32 may be defined by a radius R which may pass through the point of tangency 70 at the exit end 41 of the drum 30 and which may describe a radial profile arc 72 that may terminate at a location 74 adjacent the entrance end 39 of the radial profile spacing drum 30. The radius R may rotate about an arc center A-C. The direction of rotation of the example radial profile spacing drum 30 may be in the direction of an arrow r in FIG. 4 (also shown in FIGS. 2 and 3).

In certain example embodiments, the radial profile spacing drum 30 may include multiple radial profile flights 32, each defined by the same radius R, but each rotating about a different arc center A-C. In certain example embodiments, the arc centers A-C of the different radial profile flights 32 may be located in the same x location, but in a different y location (the descriptions in this paragraph assume a flat view of the drum 30 as shown in FIG. 4, and that the page defines an x-direction in the horizontal direction of the page, and a y-direction in the vertical direction of the page). In certain example embodiments, one or more different y locations of the arc centers A-C of different flights may be separated from each other by the same distance in the y-direction. In certain example embodiments, the y locations of the arc centers A-C of all the different flights may be separated from each other by the same distance in the y-direction. In certain example embodiments, one or more different y locations of the arc centers A-C of different flights may be separated from each other by different distances in the y-direction. In certain example embodiments, the distance in the y-direction between the center of two different flights 32 (i.e., ignoring the thickness of the flights) at drum exit end 41 is the same than at drum entrance end 39. In certain example embodiments, the distance in the x-direction between a flight 32 and the flight preceding it at entrance 39 is greater than the distance in the x-direction between said flight 32 and the flight trailing it at exit 41.

In certain example embodiments, a radius R of a flight 32 may rotate about an arc center (A-C) that may be offset from segment path 76 (beneath the spacing drum 30) both in the sense of being to one side of the spacing drum 30 (and the segment path 76) and upstream of the spacing drum 30 in the sense of the movement of segments along the segment path 76.

In an example embodiment, at the entrance end 39 of the spacing drum 30, segments $A_1$ and $B_1$ may be moving at a speed $v_1$, which may, by non-limiting example, greater than the exit speed $v_2$. As each of the segments $A_1$ and $B_1$ enter the entrance end 39 of the spacing drum 30, they may tend to position themselves, upon their own inertia, within an axial space 78 between an immediate radial flight 32 and a preceding flight 32'. The segment $B_2$ in FIG. 4 may be immediately upstream of the first segment $A_1$ and may be positioned as just described, wherein a clearance 80 may exist between a leading end portion 82 of the segment $B_2$ and the preceding flight 32'. Upon entry into the entrance end 39 of the radial profile spacing drum 30, the immediate radial profile flight 32 may contact the downstream end portion 84 of the segment $B_2$ to push the segment $B_2$ along the segment path 76 (guided by bridge 45 as described above) to the exit end 41 of the spacing drum 30. In some example embodiments, because the immediate flight 32 has a radial profile as previously described, the segment $B_2$ may be in continuous contact with the leading side 86 of the radial profile flight 32 as it progresses from the entrance end 39 to the exit end 41 of spacing drum 30, during which time the radial profile flight 32 may cause the segment to continuously decelerate from the speed $v_1$ at the entrance end 39 to the speed $v_2$ at the exit end 41.

In certain example embodiments, at the exit end 41 of the radial profile spacing drum 30, exiting segments (such as $B_3$ in FIG. 4) may be positioned on a ribbon of web 54 in an abutting, end-to-end relation to an immediately preceding exiting segment (such as $A_3$ in FIG. 4), or in another desired spacing (e.g., 1 mm. gap, 3 mm. gap, 5 mm. gap, 1 cm. gap, or other, etc.). In other words, example embodiments of spacing drum 30 may help control the exiting speed $v_2$ of exiting segments, and/or may help control the exiting position of exiting segments relative to other exiting segments. In certain example embodiments, where the y locations of the arc centers A-C of all the different flights are separated from each other by the same distance in the y-direction as described above, exiting segments may be separated from each other by approximately the same distance (or no distance). In certain example embodiments, where one or more different y locations of the arc centers A-C of different flights may be separated from each other by different distances in the y-direction as described above, exiting segments may be separated from each other by different distances.

In certain embodiments, a leading side 86 of the radial profile flight 32 will generally maintain contact with trailing end portion 84 of the segment $B_2$ during its transit across the spacing drum 30, preventing or minimizing registration issues that may occur with existing spacing drums that have an abrupt transition in the pitch of the flights (e.g., the disclosed arrangement prevents or minimizes movement along the segment path 76 without the registering/controlling effect of positive contact with the leading edge 86 of the radial profile flight 32). Impingement of segment $B_2$ upon other surfaces such as the trailing surface 87 of the immediately preceding flight 32' may also be reduced or prevented. In some example embodiments, accurate and consistent placing of exiting segments at the exit 41 of the spacing drum 30 may be enhanced.

A Method of Determining the Radius R and the Radial Profile Flight

The following teachings provide an example of a geometrical determination of the aforementioned radius R and how it may be applied to establish an array of radial profile flights 32 on a radial profile spacing drum 30 according to an example embodiment.

Figure 5:
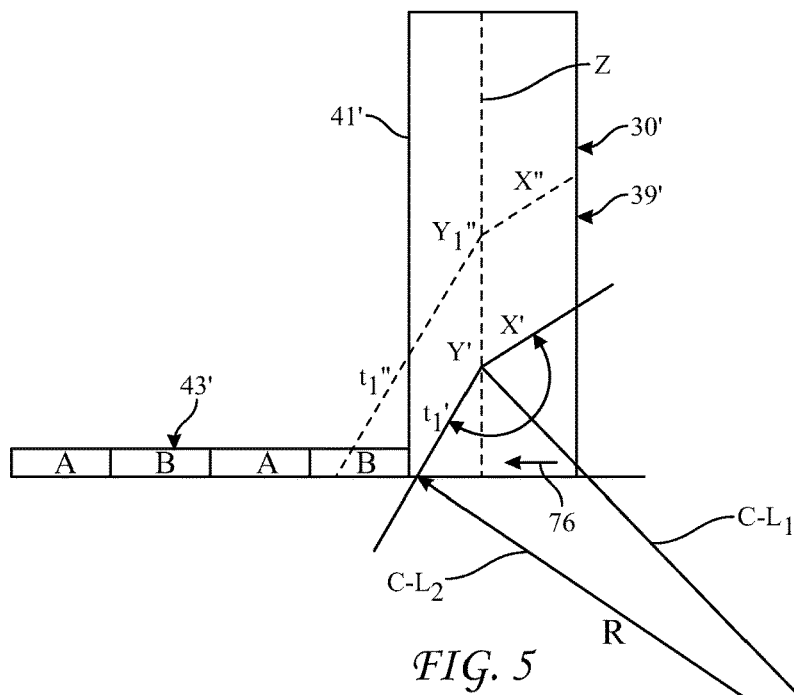
FIG. 5 is a geometric representation of a method of determining an arc-center and/or a radius for a radial profile flight, in accordance with an example embodiment of the disclosure.

Referring now to FIG. 5, the determination may start with generation of a planar geometrical representation 30' ("flat view") of the outer periphery of a spacing drum 30 according to an example embodiment. The planar drum representation 30' may have an elongate rectangular form whose longer edges 39', 41' may correspond with the entrance and exit ends 39, 41, respectively, of the radial profile spacing drum 30. Adjacent the exit end 41', a representation of repeated pattern of segments 43' is shown, which in this example may be a set of four segments (A, B, A, B). In this example, the segments A, B may be of equal length and abutting, but in other embodiments, the segments may differ in length and/or may differ in numbers, some or all may be spaced apart by a plurality of spacings 14 or some or all may be abutting with essentially no spacing between each other and/or some or all may comprise different material such as a filter material and or a tobacco material.

Where the most upstream segment (that being segment B to the left in FIG. 5) exits the planar drum representation 30', a tangent $T_1$' may be drawn, based on the same factors used in determining tangent $T_1$ described with reference to FIG. 4, namely the rotational speed of the drum 30 and the desired exit speed $v_2$. This straight line $T_1$' may be also geometrically representative of a hypothetical, straight-lined, exit flight which at the rotational speed of the drum 30 would move a segment out from the exit 41' of the drum 30' at the desired exit speed $v_2$ (of the garniture belt 42). At the entrance end 39', another inclined line x' may be drawn whose inclination may be such that it represents a hypothetical, straight-lined, entrance flight, which would at the rotational speed of the drum 30 enable the drum 30' to receive at the entrance end 39' a segment at entrance speed $v_1$. In certain example embodiments, the procession 40 of segments (A, B) approaching the entrance end 39' of the spacing drum 30' may have a greater speed and spacing than that that of the procession 43' at the exit 41'. Accordingly, the line x' may be less inclined relative to the segment path 76' than the tangent line $T_1$' and may be representative of a hypothetical, straight-lined, entrance flight having a pitch greater than the pitch of the hypothetical straight-lined, exit flight that may be represented by the straight line $T_1$'.

In some example embodiments, a point of intersection y' between the hypothetical, straight-line, exit flight $T_1$' and the hypothetical, straight-line, entrance flight x' may be arranged such that a greater portion of the axial extent of the planar drum form 30' (in the directional sense of the segment path 76') may be allocated to the hypothetical, straight-line, entrance flight x' and a lesser portion to the hypothetical, straight-line, exit flight $T_1$'. For example, in a non-limiting example embodiment, one-third of the axial extent may be longitudinally allocated to the hypothetical, straight-line, entrance flight $T_1$' and two-thirds of the axial extent may be longitudinally allocated to the hypothetical, straight-line, entrance flight x'. Such an allocation may be represented by a vertical line z in FIG. 5 and may differ from one embodiment to another.

Upon resolving a point of intersection y' between the hypothetical, straight-line, exit flight $T_1$' and the hypothetical, straight-line, entrance flight x', the smaller angle between the two at the intersection y' may be bisected to resolve a first centering line C-$L_1$, which typically will project to one-side and upstream in the sense of the segment path 76'. A second centering line C-$L_2$ may be projected orthogonally from the hypothetical, straight-line, entrance flight $T_1$' at the location where the latter intersects the exit end 41' of the planar spacing drum 30'. Typically, the second centering line C-$L_2$ may project to one side and upstream of the segment path 76 and intersect the first centering line C-$L_1$, which point of intersection may be used as an arc center A-C' for resolving the radius R of the radial profiled flight 32' in an example embodiment.

Figure 6:
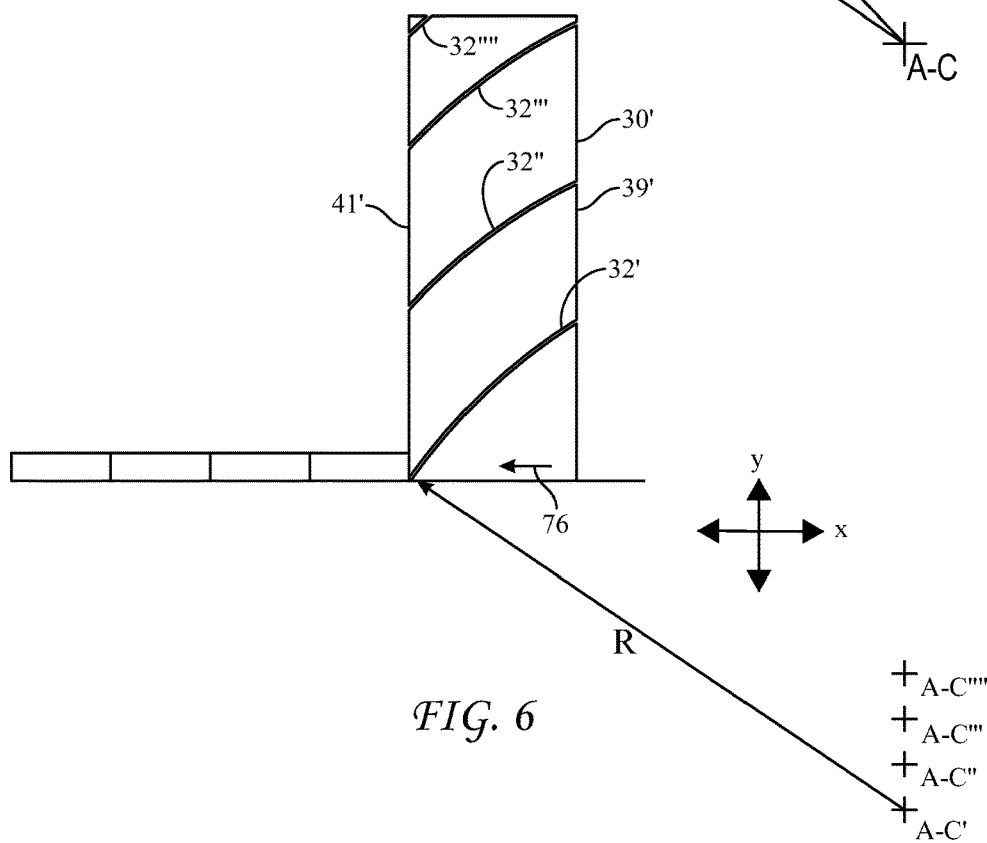
FIG. 6 is a geometrical representation of the method shown in FIG. 5 being applied to create multiple radial profile flights, according to an example embodiment.

Referring now also to FIG. 6, the radius R of the radial profiled flight 32 may be the distance between the previously established arc center A-C' and the location where the hypothetical, straight-line, exit flight $T_1$' intersects the exit end 41' of the spacing drum 30'. The planar layout of the first radial profiled flight 32' may be then projected by rotating the radius R about the arc center A-C' from the exit end 41' to the entrance end 39' of the spacing drum 30'. In some embodiments, such projection may extend between locations at or adjacent the exit end 41' and at or adjacent to the entrance end 39' of the spacing drum 30'. Accordingly, the projection may extend fully across the spacing drum or terminate short of the exit end 41' and/or the entrance end 39'.

In example embodiments, the previously described steps may then be repeated to establish a planar layout of all the radial profiled flights 32', 32'', 32''', 32'''', etc. In doing so, a row of arc centers A-C', A-C'', A-C''', A-C'''', etc. may be established in an offset relation to the segment path 76' (to one side and upstream thereof). The planar representation of the desired array of profiled flights 32', 32'', 32''', 32'''', etc. may then be converted into a three dimensional layout, which in effect, may be the result of the planar representation of the spacing drum 30' being rolled into the cylindrical form of the periphery of the actual spacing drum 30.

Once a planar representation of the desired array of radial profiled flights 32' is established, the array may be analytically or experimentally checked at the exit end 41' for adequate spacing between the flights 32' to assure that each segment may exit the spacing drum 30' without interference from a proceeding flight 32', which might otherwise cause the segment to cant or lose registered alignment and placement.

Figure 7:
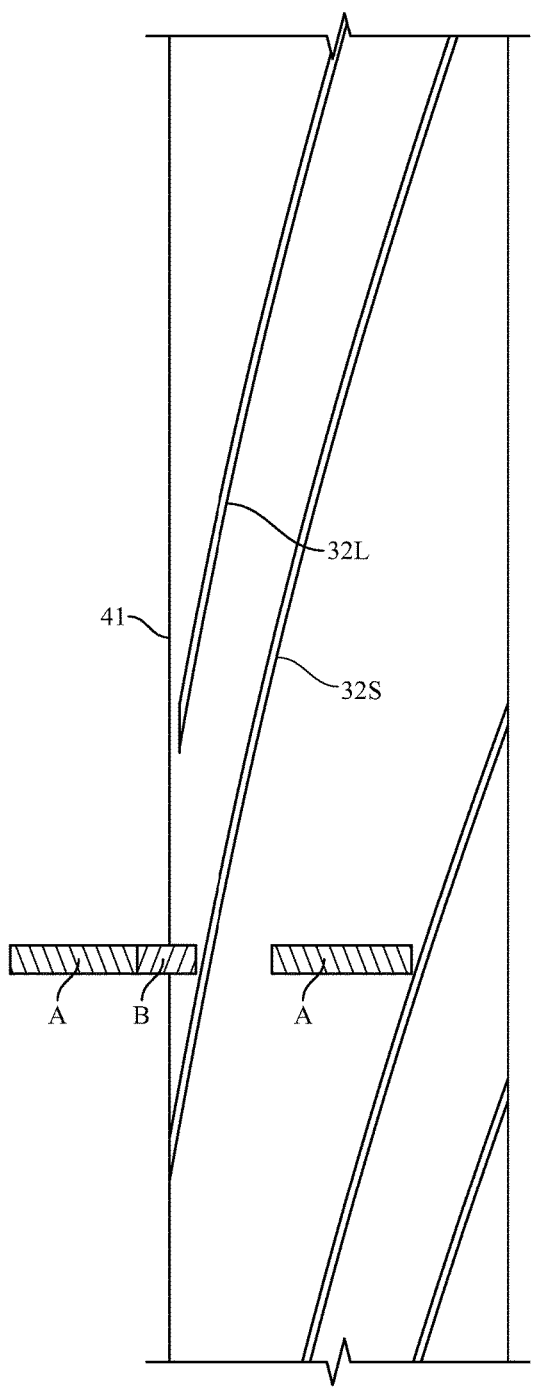
FIG. 7 is a detail view of another example embodiment of the spacing drum as viewed in the direction of arrow IV in FIG. 3, according to an embodiment.

Referring now also to FIG. 7, in an example embodiment where a segment A may be significantly longer than a segment B, a radial profile flight 32L, which may move the longer segment A, may be terminated short of the very edge of the exit end 41 of the radial profile spacing drum 30 to provide requisite clearance for the shorter segment B as it approaches the exit end 41 while the shorter segment B is being moved by a radial profile flight 32S. In doing so, the longer segment may still exit the drum 30 at the desired speed $v_2$ despite the shortening of the flight 32L which may be pushing it, because a significant portion of the longer segment A may come into contact with a moving plug wrap 54, which action assures withdrawal of the longer segment A from the exit end 41 of the spacing drum 30' at the desired speed $v_2$ and relative position. In other example embodiments, the distances between flights may be different as shown in FIG. 7 (e.g., to accommodate different segment sizes or different desired resulting spacing between segments or other purposes), but instead all the flights will continue all the way to the edge of the exit end 41 (such as shown FIGS. 4 and 8). In yet other example embodiments, all flights 32L and flights 32S may terminate short of the exit end 41 by equal or differing amounts.

Once a planar representation of the desired array of radial profiled flights 32' is established, the array may also be analytically or experimentally checked for adequate spacing between the flights 32' at the drum entrance 39' to assure that each segment (A, B) may enter drum 30' without interference from a preceding flight 32' (that its leading edge portion 82 does not impinge upon the preceding flight 32' upon entry into the spacing drum 30). Detection and/or prediction of interference at the entrance end 39 of the spacing drum 30 may be addressed by decreasing or increasing the radius R of each radial profile flight 32, while relocating the respective arc center A-C along the second centering line C-$L_2$ closer or farther to where the hypothetical, straight-line, exit flight (arc tangent) $T_1$' intersects exit end 41' of the spacing drum 30'. Changes in R, for example, will change the pitch at the entrance end 39' and increase or decrease the spacing 78 (FIG. 4) between flights (in the direction of the segment path 76') at the entrance end 39' of the planar spacing drum 30'.

In an example embodiment, an arcuate portion of the radial profile flight 32 adjacent the entrance end 39 of the spacing drum 30 may be circumferentially retracted (shifted)

away from where a projection of the arc tangent $T_1$ (from the exit end 41) would cross the entrance end 39 of the spacing drum 30. A reduction in the radius R may increase this shift and may increase the spacing 78 between flights (in the direction of the segment path 76'), whereas an increase in the radius R may decrease the spacing 78 between flights (in the direction of the segment path 76').

Figure 8:
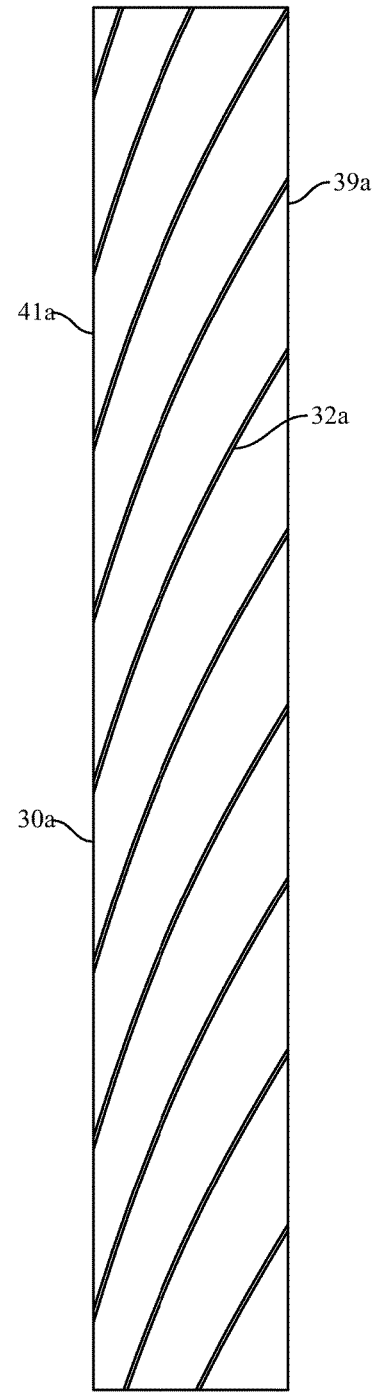
FIG. 8 is a planar representation of another example embodiment of the spacing drum in FIG. 3.

Referring now to FIG. 8, the aforementioned geometrical relationships may be used to generate the depicted planar radial flight drum 30a comprising eight radial profile flights 32a, and entrance end 39a and an exit end 41a.

Figure 9:
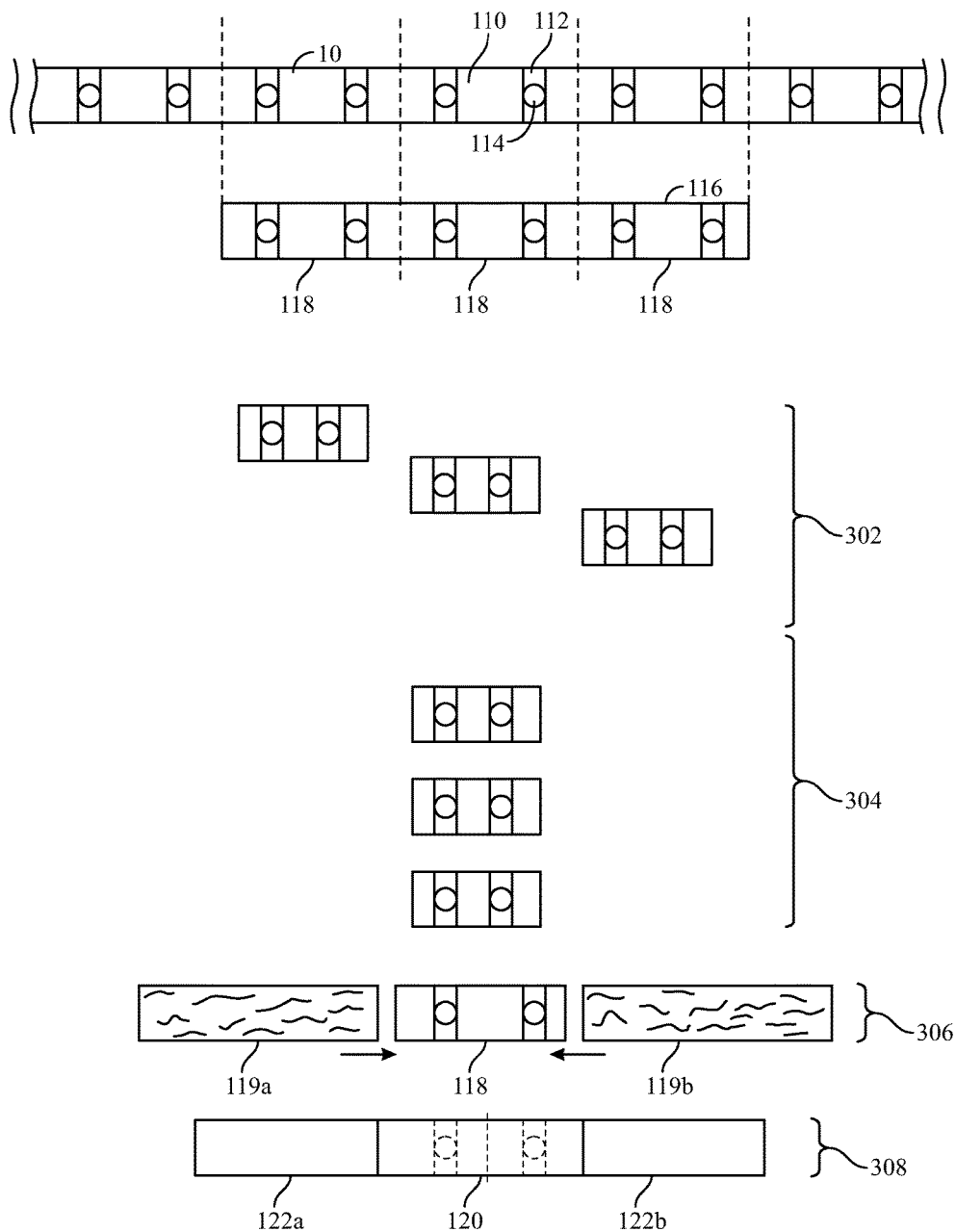
FIG. 9 is an example method of producing articles using example embodiments of the disclosure.

Referring now to FIG. 9, example embodiments may be used to construct a continuous rod 10 comprising a plurality of 2-up filter segments 110, a spacing 112 between each adjacent pair of 2-up filter segments 110 and a frangible bead 114 disposed in each spacing 112. The spacing 112 may be in the range of about 1 mm to about 3 mm in an example embodiment (but any spacing may be used). By way of non-limiting example, the bead may be a frangible flavor bead, which may be placed within each of the spacing 112 using a suitable bead feeder 50 operative between the exit 41 of the radial profile spacing drum 30 and the garniture 62 as previously described with reference to FIG. 3.

Still referring to FIG. 9 and to FIG. 3, the cutter 48 may be timed to repetitively produce a 6-up filter rod 116 from the continuous rod 10. In cigarette making operations, each 6-up filter rod 116 may be fed to a tipping machine, wherein upon a series of drums, each of the 6-up filter rod 116 may be cut into three 2-up filter constructions 118a-c, graded (302), aligned (304) and then interposed between spaced apart pairs of tobacco rods 119a,b (306), which may then be closed upon the respective 2-up filter construction, wrapped centrally with a tipping paper 120 and then severed centrally to produce two complete cigarettes 122a,b (308). In such operations, utilization of the disclosed radial profile spacing drum 30 may provide a capacity to produce the rod 112 with enhanced consistency and efficiency.

The above teachings describe embodiments wherein the segment-feed speed ($v_1$) at the entrance end 39 of the radial profile spacing drum 30 is greater than the segment-exit speed ($v_2$) at the exit end 41 of the radial profile spacing drum 30. However, the teachings herein may be applied to embodiments wherein the segment-feed speed ($v_1$) is equal to or lesser than the segment-exit speed ($v_2$) at the exit end 41 of the radial profile spacing drum 30.

It is also envisioned that the form of the radial profile flight 32 may be defined by a sweep of a radius R from the point of tangency 70 adjacent the exit end 41 of the drum 30 to a location 74 adjacent the entrance end 39 of the radial profile spacing drum 30 as previously described, but which instead of remaining constant throughout the sweep, the radius R may be increased or decreased in length as it progresses through the sweep from the point of tangency 70 at the exit end 41 of the drum 30 to a location 74 adjacent the entrance end 39 of the radial profile spacing drum 30. In some embodiments, the increase and/or decrease the length of R may be continuous. In various embodiments, the change in the length of R could be undertaken in the opposite direction, and a given spacing drum 30 may include a complete set of flights constructed in this manner, or a set of flights constructed in this manner and a set of flights constructed in the manner previously described.

Non-exclusive example embodiments of apparatus and methods are further presented in the following enumerated paragraphs. It is within the scope of the present disclosure that an individual step of a method recited herein, including in the following enumerated paragraphs, may additionally or alternatively be referred to as a "step for" performing the recited action.

PCT 1. A spacing drum comprising: a segment receiving drum section capable of receiving a predetermined number of segments per revolution of the drum from a procession of segments approaching the segment receiving drum section at a segment-feed spacing and a segment-feed speed; a segment releasing drum section capable of releasing the predetermined number of segments at a segment-release spacing and a segment-release speed, wherein the segment-release spacing is different from the segment-feed spacing, the segment-release speed is different from the segment-feed speed, or both the segment-release spacing is different from the segment-feed spacing and the segment-release speed is different from the segment-feed speed; and a radial profile flight comprising a continuous arc segment extending across at least portions of the segment receiving drum section and the segment releasing drum section, the continuous arc segment arranged to transition a segment of the predetermined number of segments from the segment-feed spacing and the segment-feed speed to the segment-release spacing and the segment-release speed, by pushing the segment as the segment travels from the segment receiving drum section to the segment releasing drum section.

PCT 2. The spacing drum of PCT 1, wherein the continuous arc segment of the radial profile flight is defined by an offset arc center.

PCT 3. The spacing drum of PCT 2, wherein an arc tangent of a releasing portion of the arc segment adjacent an exit edge of the drum imparts a segment speed essentially equal to the predetermined speed.

PCT 4. The spacing drum of PCT 3, wherein a receiving arc portion of the arc segment adjacent an entrance edge of the drum is retracted arcuately away from the arc tangent and/or wherein the single arc radius is selected such that the receiving arc portion of the arc segment is sufficiently retracted arcuately away from the arc tangent to receive the procession of segments approaching the segment receiving drum section at the segment-feed spacing and the segment-feed speed.

PCT 5. The spacing drum of PCT 4, wherein the receiving arc portion circumferentially leads the releasing arc portion and the arc segment is concave in a direction opposite of a rotational direction of the spacing drum.

PCT 6. The spacing drum of any of PCT 1-5, wherein the radial profile flight includes first and second radial profile flights defined by the single arc radius and a first offset arc center and a second offset arc center, respectively, the second arc center being spaced from the first arc center by a distance such that adjacent the exit edge of the spacing drum, the first and second radial profile flights are sufficiently spaced apart to release the respective segment from between the first and second radial profile flights with clearance between the second radial profile flight and a leading end portion of the segment.

PCT 7. A method of changing pitch along a spacing drum progressively, the method comprising: representing a peripheral surface of a spacing drum with a planar drum view, the spacing drum and the planar drum view having an entrance edge at which a procession of segments enter the spacing drum at a segment-feed rate and a segment-feed spacing and an exit edge at which the procession of segments leave the spacing drum at a segment-release speed and with a segment-release spacing; defining adjacent the entrance edge a first straight line corresponding to a first hypothetical flight, the first hypothetical flight defining a first pitch; defining adjacent the exit edge a second straight line corresponding to a second hypothetical flight, the second hypothetical flight defining a second pitch; resolving an arc-center by: resolving an angle of intersection between the first straight line and the second straight line; bisecting the resolved angle of intersection to project a first centering line; projecting a second centering line perpendicular to the second straight line from where the second straight line intersects the exit edge of the drum; whereby the arc center is resolved by an intersection of the first and second centering lines; projecting an arc across the planar drum view from the resolved arc center while using as a radius a distance between the resolved arc center and the location where the second straight line intersects the exit edge of the drum; forming a radial profile flight upon the drum peripheral surface corresponding to the arc projected across the planar drum view.

PCT 8. The method of PCT 7 further comprising adjusting the radius and relocating the arc center along the second centering line to facilitate receiving the procession of segments at the entrance edge of the drum.

PCT 9. The method of PCT 7 or 8 further comprising: establishing a desired spacing between a first radial profile flight and a second radial profile flight at the exit edge of the spacing drum by terminating one of the first radial profile flight and the second radial profile flight short of the exit edge of the drum.

PCT 10. The method of any of PCT 7, 8 or 9 further comprising offsetting arc centers of a plurality of flights from the planar drum form in a row parallel to at least one of the receiving edge and the exit edge.

PCT 11. The method of PCT 10 further comprising establishing adjacent the entrance edge of the drum a clearance between the second radial profile flight and the leading end portion of the segment by changing the radius and relocating the arc center along the second centering line.

PCT 12. A spacing drum comprising a radial profile flight which changes pitch progressively and is constructed in accordance with any of the methods of PCT 7-11.

PCT 13. A spacing drum comprising: a drum body having a segment-receiving end and a segment-releasing end; and a radial profile flight disposed along the drum body, the radial profile flight defined by a radius and a first offset arc center such that adjacent the segment-releasing end of the drum, a releasing arcuate portion of the radial profile flight is configured to push a segment along a segment path at a desired segment-exit speed, the radial profile flight including a second arcuate portion adjacent the segment-receiving end of the drum body, the second arcuate portion being configured to push the segment at a segment-receiving speed different from the segment-exit speed; the radial profile flight including an arcuate intermediate portion extending continuously between first and second arcuate portions.

PCT 15. A method of establishing an exit speed and an exit spacing between members of a procession of units, comprising: establishing a procession of units moving at an entrance speed and having an entrance spacing between the units; and converting the entrance spacing to the exit spacing and/or the entrance speed to the exit speed by passing the procession of units through a spacing drum while contacting units of the procession with radial profile flights of the spacing drum, the radial profile flights being arcuately configured such that continuous contact between a radial profile flight of the radial profile flights and a respective unit is generally maintained during the conversion, whereby the radial profile flights change pitch continuously from an entrance edge of the drum to an exit edge of the drum; whereby the spacing is changed from the entrance spacing to the exit spacing and/or the speed is changed from the entrance speed to the exit speed.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A spacing drum comprising:
    a segment receiving drum section configured to receive a number of segments per revolution of the spacing drum from a procession of segments approaching the segment receiving drum section at a segment-feed spacing and a segment-feed speed;
    a segment releasing drum section configured to release the number of segments at a segment-release spacing and a segment-release speed, wherein the segment-release spacing is different from the segment-feed spacing, the segment-release speed is different from the segment-feed speed, or both the segment-release spacing is different from the segment-feed spacing and the segment-release speed is different from the segment-feed speed; and
    a radial profile flight comprising a continuous arc segment defined by an offset arc center and extending across at least portions of the segment receiving drum section and the segment releasing drum section, the continuous arc segment configured to transition a segment of the number of segments from the segment-feed spacing and the segment-feed speed to the segment-release spacing and the segment-release speed, by pushing the segment as the segment travels from the segment receiving drum section to the segment releasing drum section.

2. The spacing drum of claim 1, wherein the continuous arc segment of the radial profile flight is further defined by a constant radius.

3. The spacing drum of claim 2, wherein the spacing drum includes a second radial profile flight comprising a second continuous arc segment defined by a second offset arc center and the constant radius, the offset arc center and the second offset arc center being spaced apart.

4. The spacing drum of claim 1, wherein the continuous arc segment of the radial profile flight is further defined by a non-constant radius that decreases or increases as the continuous arc segment extends across the at least portions of the segment receiving drum section and the segment releasing drum section.

5. The spacing drum of claim 1, wherein a tangent of a releasing portion of the continuous arc segment adjacent an exit edge of the spacing drum imparts a segment speed essentially equal to the segment-release speed.

6. The spacing drum of claim 5, wherein a receiving arc portion of the continuous arc segment adjacent an entrance edge of the spacing drum is retracted arcuately away from the tangent.

7. The spacing drum of claim 1, wherein the segment-feed speed is greater than the segment-release speed, the segment-feed spacing is greater than the segment-release spacing, or both the segment-feed speed is greater than the segment-release speed and the segment-feed spacing is greater than the segment-release spacing.

8. The spacing drum of claim 1, wherein the continuous arc segment is concave in a direction opposite of a rotational direction of the spacing drum.

9. A method of establishing an exit speed and an exit spacing between members of a procession of units, comprising:
  establishing a procession of units moving at an entrance speed and having an entrance spacing between units of the procession of units; and
  converting (i) the entrance spacing to an exit spacing, (ii) the entrance speed to an exit speed, or both (i) and (ii), by passing the procession of units through a spacing drum while contacting units of the procession of units with radial profile flights of the spacing drum, at least one of the radial profile flights being defined by an offset arc center and a radius, the radial profile flights being arcuately configured such that continuous contact between a radial profile flight of the radial profile flights and a respective unit is generally maintained during the conversion, whereby the radial profile flights change pitch continuously from an entrance edge of the spacing drum to an exit edge of the spacing drum.

10. A method of changing pitch along a spacing drum progressively, the method comprising:
  representing a peripheral surface of a spacing drum with a planar drum view, the spacing drum and the planar drum view having an entrance edge at which a procession of segments enter the spacing drum at a segment-feed speed and a segment-feed spacing and an exit edge at which the procession of segments leave the spacing drum at a segment-release speed and with a segment-release spacing;
  defining, adjacent the entrance edge, a first straight line corresponding to a first hypothetical flight, the first hypothetical flight defining a first pitch;
  defining, adjacent the exit edge, a second straight line corresponding to a second hypothetical flight, the second hypothetical flight defining a second pitch;
  resolving an arc center by
    resolving an angle of intersection between the first straight line and the second straight line;
    bisecting the resolved angle of intersection to project a first centering line; and
    projecting a second centering line perpendicular to the second straight line from a location where the second straight line intersects the exit edge of the spacing drum;
    whereby the arc center is resolved by an intersection of the first and second centering lines;
  projecting an arc across the planar drum view from the resolved arc center while using as a radius a distance between the resolved arc center and the location where the second straight line intersects the exit edge of the spacing drum; and
  forming a first radial profile flight upon the spacing drum peripheral surface corresponding to the arc projected across the planar drum view.

11. The method of claim 10, further comprising:
  adjusting the radius and relocating the arc center along the second centering line to facilitate receipt of a segment of the procession of segments at the entrance edge of the spacing drum.

12. The method of claim 10, further comprising:
  forming a second radial profile flight while establishing a desired spacing between the first radial profile flight and the second radial profile flight.

13. The method of claim 12, wherein the desired spacing is selected adjacent the exit edge of the spacing drum such that a segment being moved by the first radial profile flight exits from the spacing drum with clearance between the second radial profile flight and a leading end portion of the segment.

14. The method of claim 13, wherein the spacing drum comprises a number of radial profile flights, and
  wherein the method further comprises:
    adjusting the desired spacing by (i) changing the number of radial profile flights (ii) terminating at least one of the radial profile flights short of the exit edge of the spacing drum, or both (i) and (ii).

15. The method of claim 12 further comprising:
  establishing adjacent the entrance edge of the spacing drum a clearance between the second radial profile flight and a leading end portion of a segment by changing the radius and relocating the arc center along the second centering line.

16. The method of claim 12 wherein arc centers of the radial profile flights are offset in the planar drum view and arranged in a line parallel to a receiving edge.

17. The method of claim 10, wherein the segment-feed speed is greater than the segment-release speed, the segment-feed spacing is greater than the segment-release spacing, or both the segment-feed speed is greater than the segment-release speed and the segment-feed spacing is greater than the segment-release spacing.

18. A spacing drum comprising a radial profile flight constructed in accordance with the method of claim 10.

19. A spacing drum comprising:
  a drum body having a segment-receiving end and a segment-releasing end; and
  a first radial profile flight disposed along the drum body, the first radial profile flight defined by a radius and a first offset arc center such that adjacent the segment-releasing end of the spacing drum, a releasing arcuate portion of the first radial profile flight is configured to push a segment along a segment path at a desired segment-exit speed, the first radial profile flight including a second arcuate portion adjacent the segment-receiving end of the drum body, the second arcuate portion being configured to push the segment at a segment-receiving speed different from the desired segment-exit speed;
  the first radial profile flight including an arcuate intermediate portion extending continuously between the releasing arcuate portion and the second arcuate portion.

20. The spacing drum of claim 19, wherein the releasing arcuate portion, the second arcuate portion and the arcuate intermediate portion are continuous and the radius is a non-constant radius.

21. The spacing drum of claim 19, wherein the releasing arcuate portion, the second arcuate portion and the arcuate intermediate portion are continuous and defined by the first offset arc center and the radius.

22. The spacing drum of claim 21 further comprising:
  a second radial profile flight defined by the radius and a second offset arc center spaced apart from the first offset arc center.

23. The spacing drum of claim 22, wherein the second offset arc center is spaced from the first offset arc center by a distance such that the releasing arcuate portion of the first radial profile flight and a releasing arcuate portion of the second radial profile flight are sufficiently spaced apart adjacent the segment-releasing end of the spacing drum to release a segment from between the first and second radial profile flights with clearance between the second radial profile flight and a leading end portion of the segment while contacting the segment with the releasing arcuate portion of the first radial profile flight.

24. The spacing drum of claim 21, wherein the first and second offset arc centers are located relative to a planar, projected drum view that corresponds with a periphery of the drum body, the first and second offset arc centers being in a line parallel to an entrance end of the planar, projected drum view and offset orthogonally from an axis of symmetry of the planar, projected drum view.

* * * * *